United States Patent

Kobayashi et al.

[11] Patent Number: 4,817,641
[45] Date of Patent: Apr. 4, 1989

[54] WIG BASE AND METHOD OF PRODUCING SAME

[75] Inventors: Hisao Kobayashi, Machida; Kosuke Mochizuki, Katsushika, both of Japan

[73] Assignee: Aderans Co., Ltd., Tokyo, Japan

[21] Appl. No.: 205,481

[22] Filed: Jun. 1, 1988

Related U.S. Application Data

[63] Continuation of Ser. No. 882,939, filed as PCT JP85/00642 on Nov. 18, 1985, published as WO86/02811 on May 22, 1986, abandoned.

[30] Foreign Application Priority Data

Nov. 17, 1984 [JP] Japan .................................. 59-241614

[51] Int. Cl.4 .................................................. A41G 3/00
[52] U.S. Cl. ................................................... 132/201
[58] Field of Search .......................... 132/5, 7, 53, 56; 264/222

[56] References Cited

U.S. PATENT DOCUMENTS

| | | | |
|---|---|---|---|
| 3,037,261 | 6/1962 | Hess | 28/153 |
| 3,189,035 | 6/1965 | Heck | 132/5 |
| 3,626,954 | 12/1971 | Ostrom | 132/5 |
| 3,835,868 | 9/1974 | Heck | 132/5 |
| 3,905,378 | 9/1975 | Levin | 132/5 |
| 4,202,359 | 5/1980 | Clifton et al. | 132/5 |
| 4,297,315 | 10/1981 | Kasai et al. | 132/5 |
| 4,422,230 | 12/1983 | Nemoto | 132/5 |
| 4,530,810 | 7/1985 | Nemoto | 264/222 |
| 4,606,359 | 8/1986 | Palumbo et al. | 132/53 |

FOREIGN PATENT DOCUMENTS 2450153 9/1980 France .
1255711 12/1971 United Kingdom .

Primary Examiner—Richard J. Apley
Assistant Examiner—J. Welsh
Attorney, Agent, or Firm—Nixon & Vanderhye

[57] ABSTRACT

A wig base which is in strict agreement with the shape of the head of a person who wears it and which is not deformed even after used for many years, and a method of producing the same. To produce the wig base, a net member which constitutes the whole or part of the wig base is brought into substantial agreement with the shape of the head of a person who wears it, resin is applied onto the filaments forming the net and onto the intersecting points and peripheries thereof to temporarily mold the wig base, followed by adhesion of the intersection points of the filaments by welding.

11 Claims, 3 Drawing Sheets

WIG BASE AND METHOD OF PRODUCING SAME

This is a continuation of application Ser. No. 882,939, filed as PCT JP85/00642 on Nov. 18, 1985, published as WO86/02811 on May 22, 1986, now abandoned.

TECHNICAL FIELD

The present invention relates to a wig base having a network in its entire area or locally, and to a method of producing the same, and more particularly it pertains to a wig base whose network is given a special shaping treatment to insure that the wig maintains such contour and dimension as are in strict agreement with the shape of the user's head, on which the wig is to be placed, so as to comply to the individual wig wearer, and also the invention relates to the manufacturing method thereof.

BACKGROUND TECHNIQUE

Hairpieces of various types using a network as the wig base have been known in the past. A wig base having a locally-disposed network is comprised, as shown in Japanese Utility Model Preliminary Publication No. Sho 58-176926 filed by the present applicant, of: a hair-dividing region made of a plastic sheet for giving an external appearance as if of the user's own skin; a central net portion; and a reinforcing support portion, and these region and portions are anchored to each other by a specific means. Also, a hairpiece such that the entire wig base is constructed by a network is disclosed in, for example, U.S. Pat. No. 3,905,378.

The materials of the network which are used in these prior techniques are usually nylon monofilaments, and the monofilament is shaped into a network by welding. According to the method of said U.S. patent, a hairpiece is manufactured, for example, by placing a first plane which is comprised of a group of warps made of nylon filaments of a diameter of 0.005 inch and disposed in the plane with a filament-to-filament spacing of 0.05 inch, upon a second plane consisting of a group of wefts of likewise-disposed nylon filaments crossing at right angles the group of warps, with these two groups of filaments not being woven into each other, and by welding, by relying on an ultrasonic wave heating while maintaining the state of the planar pattern, the respective points of intersection of the monofilaments which cross each other at right angles, thereby forming a planar non-woven nylon network; thereafter using a head-contoured male mold which closely conforms to the user's head contour and which has been sorted out in advance from among several different kinds of heatable models of head-contoured male molds, and pressing and drawing said planar non-woven nylon network against said head-contoured male mold while heating, thereby preliminarily shaping it so as to present the contour of the head portion; cutting it into a required contour and dimension; and thereafter securing hair fibers to said welded sites, whereby a hairpiece is manufactured. In case a net base is constructed according to the above-mentioned method, the non-woven network which originally has been formed into a planar shape is markedly deformed or drawn by both the heat and the physical coercive force applied thereto during the aforesaid preliminary shaping process, and thus it eventually presents various uneven mesh pattern regions depending on the individual sites. Although the network is shaped temporarily into a substantially same shape as that of the heat-contoured male mold due to heat-setting, the nylon filaments which are made of a thermoplastic resin have the tendency to restore their original shape with the passage of time, so that they will either restore their originally shaped pattern of crossing at right angles owing to said tendency and also to the welding force applied at the right-angle crossings at the points of intersection of the warp and weft filaments, or they will go so far as to cause a breakage at the welded sites. Not only that, even when a plurality of head-contoured male molds are prepared beforehand, the contour and dimension of the user's head is such that there is wide variation per individual persons, and thus it is not always possible to manufacture a wig base made of a network having such contour and dimension as are in substantial agreement with the head contour of each individual user.

OBJECTS OF THE INVENTION

An object of the present invention is to provide a wig base having a contour substantially agreeing with the contour and dimension of the head shape of the user by the employment of an original replica mold directly obtained from the user's own head portion, and giving a good sensation when worn.

Another object of the present invention is to provide a wig base having a sufficient durability for use of many years without developing deformation or loss of its original shape.

Still another object of the present invention is to provide a wig base which is lightweight and which gives an excellent ventilation, thereby reducing the development of perspiration from the user's scalp and which, thus, gives a good sensation during use.

Yet another object of the present invention is to provide a method of manufacturing, with an improved precision, a wig base which hardly develops loss of its original shape or deformation by first applying a wig base to the head portion of the user, holding same so as to be in substantial agreement with the shape thereof, applying a resin coating to the peripheries including the respective net-constituting filaments and their points of intersection, thereby making a preliminary shaping, and thereafter welding the respective intersecting points of filaments together.

DISCLOSURE OF THE INVENTION

In order to attain the various objects stated above, in the method of manufacturing a wig base according to the present invention, a synthetic resin film which is to be peeled off later is applied, as a first step, to the head-contoured male mold obtained of its shape directly from the user's own head portion, then a first network is placed onto said film to cover same, and then a second network formed as a plain fabric is placed onto said first network to cover same, and the resulting assembly is soaked in a solution of resin as a coating treatment while keeping the above-mentioned state of the assembly and it is dried, thereby making a preliminary shaping, and thereafter the resulting resin-treated second network is peeled, via said synthetic resin film, off the head-contoured male mold and also off said first network, thereby obtaining a head-contoured net pattern for use as a base, and then the intersecting points of filaments of said net pattern are welded, respectively, and the resulting pattern is cut to comply to the required dimension, whereby a wig base formed entirely or at least locally with a network and substantially conforming to the contour and dimension of the user's head shape is manufactured.

The wig base thus manufactured has a net pattern strictly in agreement with the contour and dimension of the user's head shape, and the respective filaments of warps and wefts which constitute said net pattern are fixed respectively into a meshed form of a substantially diamond shape from the original plainwoven mesh pattern, and furthermore the respective intersecting points of filaments are welded, and along therewith the above-mentioned prelimarily molded resin coating is cured further, so that said mesh pattern has an all-the-more stabilized structure.

BRIEF DESCRIPTION OF THE DRAWINGS

The drawings show a preferred embodiment of the present invention.

BEST MODE OF CARRYING OUT THE INVENTION

Detailed description will be made hereunder, by giving reference to FIG. 1 to FIG. 7, with respect to a preferred embodiment of the wig base and its manufacturing method according to the present invention.

Figure 1:
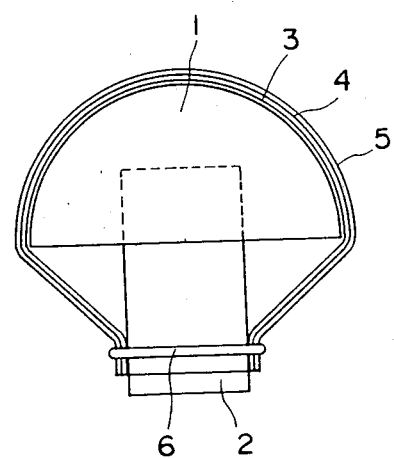
FIG. 1 is a diagrammatic illustration showing the state in which a network which constitutes a wig base of the present invention is placed to cover a head-contoured male mold which is in agreement with the head shape of the user.

In FIG. 1, reference numeral 1 represents a substantially hemispherical head-contoured male mold held on a supporting stand 2. Said head-contoured male mold 1 is such that its shape has been obtained directly from the head portion of the user and has been molded so as to substantially comply to the contour and the dimension of the user's head shape. The fundamental configuration of the wig base according to the present invention is made on this head-contoured male mold 1. Here, description will be made of the method of molding said head-contoured male mold 1. As a first step, there is made a female mold complying to the user's head shape. This female mold may be molded by applying a plural number of plaster strips onto the head portion and by curing same. Preferably, however, a thermoplastic synthetic resin sheet having the property to become softened by heating at a low temperature and become moldable and also to become hardened when cooled down to room temperature, e.g. a thin sheet of transpolyisoprene, is used conveniently. With respect to the details of the technique of manufacturing a supporting device for wigs by the use of this thin sheet, reference may be given to U.S. Pat. No. 4,422,230 published on Dec. 27, 1983 and owned by the present assignee. The abovesaid synthetic resin sheet in its softened state is applied to and urged against the head portion uniformly, and upon this synthetic resin sheet having been hardened, it is removed from the head portion, and thus a female mold is formed. Next, the forward end portion of the supporting stand 2 is inserted in this female mold, and a molding material such as plaster slurry is poured thereinto and is hardened. After hardened, said female mold is removed, and thereby a head-contoured male mold 1 representing a faithful replica of the user's head shape completes. In the present invention, it is the first feature thereof to use a head-contoured male mold 1 which represents a faithful replica of the user's head portion as stated above.

To begin with, a thin synthetic resin film 3 having a thickness of, for example, 0.3 mm or less is placed onto said head-contoured male mold 1 so as to cover the entire surface thereof, while paying attention so as not to develop wrinkles or slackenings. This synthetic resin film 3 is intended to make it easy to peel a net pattern off the head-contoured male mold 1 in a subsequent step which will be described later. A thin film of polyethylene is conveniently used.

A very thin first network 4 of an appropriate size is applied from above the abovesaid synthetic resin film 3 to cover the entire surface thereof without causing wrinkles or slackenings in a same manner as stated above. This first network 4 has small-size meshes as noted with, for example, nylon stockings. This first network is intended to be used in such a way that, when a second network for constituting the principal member of a wig base and for being used in the step of the next stage is subjected to a treatment with a resin by dipping it thereinto, no resin film will develop to block the meshes of the second network which is intended to be used as material for constituting said wig base. Accordingly, so long as the first network is one which complies to this object, it is possible to use it regardless of the type of the material, in particular, with which it is made. However, since the first network is to be discarded after the second network has been treated with a resin, a network made of a cheap-price nylon is suitable.

From above said first nylon network 4, a second network 5 which constitutes the principal member of the wig base is placed to cover the entire surface of the first network in such a state that it has no wrinkles or slackenings. This second network 5 which is intended for a wig base is comprised of a nylon filament of usually 220–330 denier. As will be noted from the enlarged plan view of FIG. 2, the first filament 5a and the second filament 5b are plain-woven, alternately crossing each other at intervals, and the resulting network 5 has about 15 to 50 meshes 5c. Such a second network 5 for a wig base may be constructed by two sheets of network by placing one upon another as desired, by taking the durability or the toughness of the wig base into consideration. If an assembly formed by two networks which are superposed one upon another is used to serve as the wig base, the knots of the hair affixed to the outer network are positioned on the inner network, and accordingly it is possible to prevent the damaging of the user's scalp which is caused when said knots are brought into contact with the scalp. As stated above, in case the second network 5 which is comprised of two sheets is used, it is only necessary to place the two sheets of network 5 one after another onto the first network 4 from thereabove. Thus, after the synthetic resin film 3, the first network 4 and the second network 5 are placed one after another in this order onto the head-contoured male mold 1 in such a manner as will not cause wrinkles or slackenings, the respective edge portions of these members are collected at the position of the supporting stand 2 and they are fixed via a fixing member 6 such as a rubber ring or a strand, to be ready to be subjected to the next soaking step.

The respective networks covering the entire surface of said head-contoured male mold and being in the state of being secured to the supporting stand are then soaked, in an upside down posture, into a resin solution which is intended for producing a coating. The polyurethane resin solution which is used in such a step, preferably, is diluted beforehand to an appropriate degree of concentration. In case this degree of dilution represents, for example, excessively dense, there will be formed a film of the applied resin at the meshes 5c of the resin-treated second network in spite of the intervention of the first network 4, bringing about impairment of the function of the network. Conversely, a too light density will give rise to problems such that the preliminary formation of the head shape of the second network lacks accuracy. The present inventors, as a result of the experiments conducted by using, as the polyurethane resin solution, a double-liquid type polyurethane composite containing a polyisocyanate, a polyole and a catalytic component, and using, as the diluting agent, MEK(methyl ethyl ketone) solvent, and by changing their volumic mixing ratio in various ways, have confirmed that, preferably, by using 300–1000 parts by weight of MEK solvent for 35–65 parts by weight of polyisocyanate and 65–35 parts by weight of polyole, there is obtained a good result of treatment by resin on the entire surfaces of those regions surrounding and containing the respective points of intersection 5d of the filaments of the second nylon network.

The treatment of the coverings by soaking them into the resin solution is conducted either by soaking all the coverings provided on the supporting stand as shown in FIG. 1 into the polyurethane resin solution relying on the ordinary soaking method while holding the rod portion of the stand, or by applying the resin solution uniformly over the second network by using a brush or the like. This is followed by drying for 4–8 hours at about 100° C. in a dryer to cure the resin. FIG. 3 shows the state that the external circumferential surface of a filament 5a(5b) of the second network 5 is coated with a polyurethane resin film 7. This resin film 7 not only coats the respective circumferential surfaces of the crossing filaments, but further the resin film 7 adheres also at the sites of their intersections 5d (FIG. 2), so that the filaments 5a and 5b are bonded to each other. Accordingly, the second network 5 is coated with the resin while being held on the head-contoured male mold 1 and cured in the dryer, so that the shape of the second network after having been dried such that this network is treated with the resin in such a state that is preserves the user's head shape, and thus a preliminary shaping is performed. It should be noted here that, when the network 5 is soaked in said polyurethane resin solution and is drawn up therefrom, there could occur that the film of the applied resin is formed temporarily on some of the meshes 5c of the network 5 due to the action of surface tension of the solution. However, this film of applied resin will slither immediately onto the first network 4 as this first network 4 contacts the second network 5. Thus, there never occurs that the resin films applied to the meshes 5c are dried as they are.

The preliminarily shaped network 5 after being dried and cured is peeled off from the head-contoured male mold 1 via the synthetic resin film 3, and thus there is obtained a net pattern N so shaped as having a configuration conforming to the user's head shape. As such time, the first network 4 which has been peeled off from the second network 5 is discarded.

Figure 4:
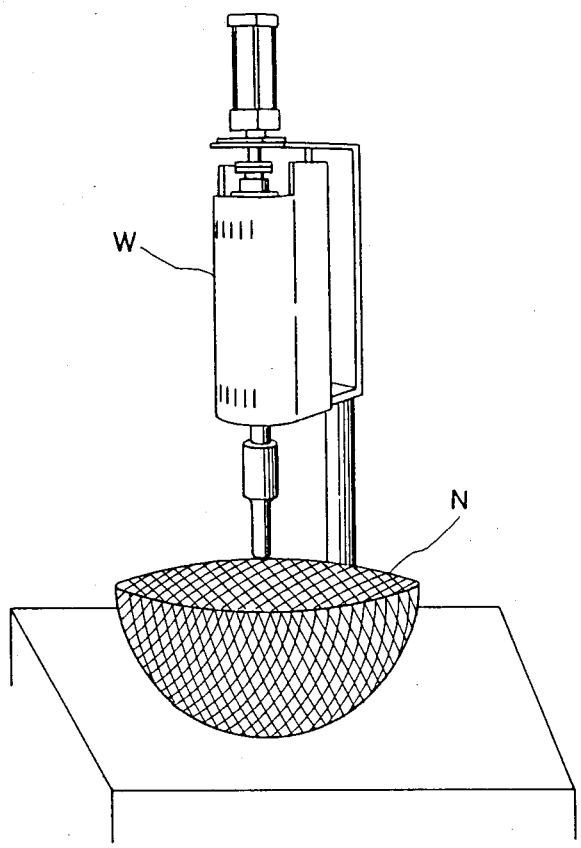
FIG. 4 is a front view showing the net pattern which has been preliminarily shaped is welded by relying on an ultrasonic wave welder.

Next, the net pattern N preserving the head shape which is to be used as a wig base is then subjected to a further heat-welding at the intersecting points 5d of the first and second filaments which constitute said net pattern and which have been bonded together (see FIG. 4). This welding of the intersecting points 5d of the respective filaments of the net pattern N is conveniently performed by the use of an ultrasonic wave welder W. For example, welding is performed by setting the output at 450–2000W, the horn diameter at 20–50 mm, the horn pressure at 1.5–6.0 kg/cm and the horn pressure time at 0.2–0.8 second. Here, when consideration is given to the necessity for preserving the accurate head shape of the net pattern N after its having been subjected to the treatment by ultrasonic wave, the horn diameter is the smaller the more desirable. When considering the aspect of the efficiency of operation, however, a large horn diameter is desirable. From the above-mentioned considerations, therefore, the more preferred horn diameter is such that 30–50 mm is suitable. The output of the ultrasonic wave welder is set substantially in compliance to the horn diameter decided. If, however, the output is too small, this will result in an incomplete welding of the intersecting points 5d of the filaments. Conversely, if it is too large, this will lead to a reduction of the mechnical strength of the nylon filaments after having been treated with the ultrasonic wave. Also, the intensity of the horn pressure and the length of the horn pressure time will, likewise, affect the reduction, etc. of the mechanical strengths of the weld and of the nylon filaments. Therefore, as a result of the experiments conducted by the present inventors by taking the abovementioned various aspects into consideration, it has been found that, by the use of an ultrasonic wave welder having a horn diameter of 30–50 mm and whose horn output is set at 600–1800W, horn pressure at 2.0–5.0 kg/cm² and horn pressure time at 0.2–0.6 second, it is possible to accomplish a firm weld of the intersecting points 5d of filaments.

Figure 2:
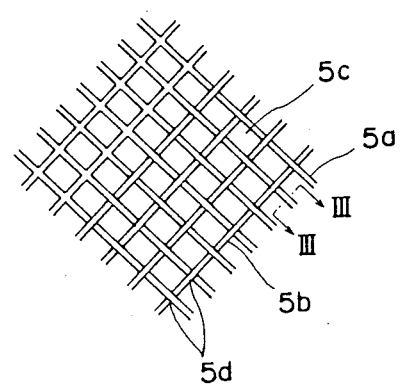
FIG. 2 is a plan view, partly on an enlarged scale, showing the state in which the network of FIG. 1 is locally welded.
Figure 3:
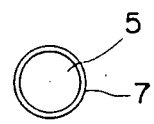
FIG. 3 is a sectional view taken along the line III—III in FIG. 2.

Thus, the respective points of intersection 5d of the filaments are first bonded and preliminarily anchored to each other by the polyurethane resin, and thereafter they are further welded as noted in the upper portion of FIG. 2, and in addition, the layer of the polyurethane resin coating the entire circumferential surfaces of the first and second filaments is hardened all the more. Therefore, the net pattern N is presserved for an extended period of time in its state of being strictly complying to the user's head shape.

Figure 5:
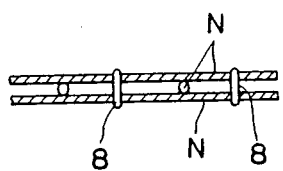
FIG. 5 is an illustration, partly on an enlarged scale, showing the state in which two net pattern sheets are superposed one upon another and fixed together.

It should be noted here that, in case it is intended to use the second network for the wig base which is comprised of two sheets of network, it is only necessary to operate so that the two sheets of net patterns 5, 5 which have been placed, in their superposed fashion, on said head-contoured male mold 1 and which are in the state of having been soaked in the polyurethane resin solution and then dried and cured are peeled off carefully one after another, and that, thereafter, the intersecting points 5d of the respective filaments are welded. And, after the welding process, two sheets of same-shaped net patterns N, N are superposed one upon another again, and in a manner as shown in FIG. 5, the upper and lower net patterns N, N are sewn, bonded, welded or otherwise connected together at appropriate sites thereof to form anchored portions 8 (see FIG. 5).

Figure 6:
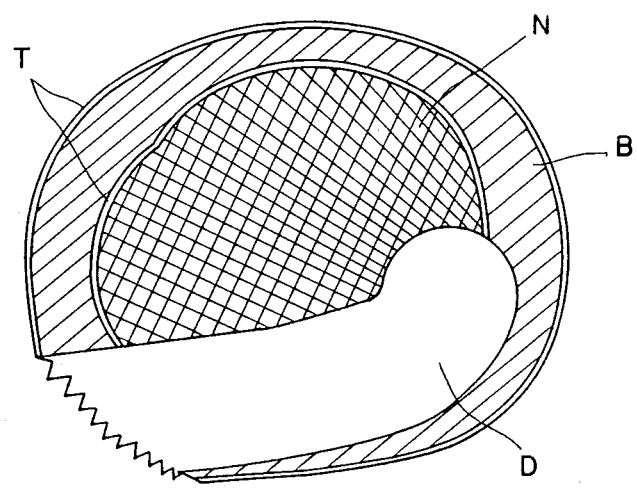
FIG. 6 is a plan view of a wig base locally having a net pattern manufactured according to the present invention.
Figure 7:
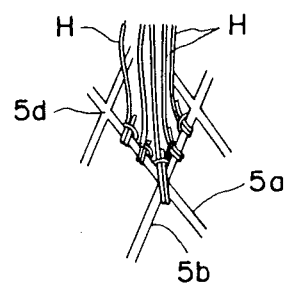
FIG. 7 is a diagrammatic illustration, partly on an enlarged scale, of a network affixed with human hair and/or false hair.

Finally, the net pattern N thus obtained which has a shape conforming to the user's own head shape is cut into a predetermined dimension to thereby complete a network for a wig base having a desired contour and dimension. If the whole wig base is intended to be formed with a network, it is only necessary to first cut it into a predetermined dimension, and then to either bond or sew a hemming tape to the marginal edge portions of the network, or to weld these edge portions. FIG. 6 is a plan view showing an example of the instance wherein a net pattern N is used as a part of the wig base. This is comprised of a centrally positioned net base portion N, a hair-dividing portion D made of a synthetic resin, and a reinforcing support portion B disposed in their marginal portions. These portions are sewn to each other, and they are bonded together by a hemming tape T. And, hair made of human hair and/or false hair is affixed to these respective portions to be completed into a hairpiece. As shown in FIG. 7, however, hair H is bound at appropriate sites as well as at the intersecting points 5d of the first and second filaments 5a and 5b, and thus hair is fixed to the net pattern N.

Here, the mesh pattern of the net pattern N is formed to have a substantially diamond-like pattern shape by taking into consideration the alignment of orientation of hair at the time of affixing the hair. In order to form this diamond-shape pattern, it is only necessary to operate in such a way that, when the second network 5 is placed to cover the head-contoured male mold 1, the nylon network is drawn so as to insure that the substantially rectangular meshes are deformed into a diamond shape and fixed in such a shape, and then it is fastened by means of a fixing member 6 such as a rubber ring, and that the resulting network is coated with a resin in such a state of shape as mentioned just above, and hardened.

As the resin for use in the above-mentioned coating process, description has been made of the instant example which uses a thermosetting double-liquid type polyurethane resin solution. However, it is a matter of course that the resin is not limited thereto, and that a thermoplastic nylon resin having an intensive bonding force may be used appropriately. By using a thermoplastic resin, this is preferable in that the weld at the intersecting points of filaments in the subsequent ultrasonic wave welding process can be all the more strengthened.

INDUSTRIAL UTILITY

As described above, according to the present invention, a net pattern is fabricated by the use of the user's own head shape, and moreover the circumferential surfaces of the filaments constituting said net pattern and the intersecting points of these filaments are all treated with a resin. Accordingly, the completed wig base possesses a contour and a dimension which are in agreement with the user's head shape with a good precision. Along with this, the wig base can maintain a good wearing sensation without developing deformation or collapse of shape during its use for an extended period of time, and it is useful in manufacturing, on the order-made basis, either a whole wig or a toupee which is excellent in durability, and which is in precise agreement with the head shape of the user which differs with each individual user.

We claim:

1. A method of producing an individually shaped male wig base, comprising the successive steps of:
   (1) preparing a head-contoured male mold shaped directly from a user's own head;
   (2) placing a synthetic resin film on said male mold to cover the same;
   (3) placing a first network of a woven fabric with meshes and a second network of a woven fabric with crossing filaments forming meshes larger than that of said first network, in the order stated, on said synthetic resin film so as to cover the entire surface of said male mold without wrinkles;
   (4) soaking said synthetic resin film and said first and second networks held on said male mold with a resin solution to coat the filaments of said second network and their intersections with the resin solution, said first network serving to absorb the resin solution to prevent films from being formed on the meshes of said second network;
   (5) drying and curing the resin solution to bond the filaments of said second network to each other at the intersections to preliminarily shape said second network;
   (6) peeling off said second network from said first network to provide a head-shaped net pattern intended for use as the wig base; and
   (7) heat-welding the intersections of the filaments of said head-shaped net pattern.

2. A method of producing a wig base according to claim 1 in which said first network is formed with a very thin knit-woven fabric of nylon.

3. A method of producing a wig base according to claim 1 in which, said second network of fabric is formed in plain weaving using a nylon filament of 220-330 denier.

4. A method of producing a wig base according to claim 1 in which said second network is comprised of a laminated body of two superposed sheets of woven fabric.

5. A method of producing a wig base according to claim 1 in which said resin solution intended for a coating treatment is composed of a polyurethane composition and a diluting agent.

6. A method of producing a wig base according to claim 5, in which said polyurethane composition consists essentially of 35-65 parts by weight of polyisocyanate, 65-35 parts by weight of polyole and 300-1000 parts by weight of MEK solvent.

7. A method of producing a wig base according to claim 1, in which said resin solution intended for a coating treatment is composed of a thermoplastic nylon resin.

8. A method of producing a wig base according to claim 1, in which the heat-welding is performed by ultrasonic wave heating.

9. A method of producing a wig base according to claim 8, in which said ultrasonic wave heating is performed by the use of a ultrasonic wave welder whose output is set at 450-2000W, horn diameter of 20-50 mm, horn pressure at 1.5-6.0 kg/cm$^2$, and horn pressure time at 0.2-0.8 second.

10. A method of producing a wig base according to claim 1 in which said head-contoured male mold is prepared by:

(a) applying a thermoplastic resin sheet, softenable and shapeable when heated at a relatively low temperature and hardenable when cooled to room temperature, in a heated, softenable state to said user's head, (b) allowing the sheet to cool and harden forming a female mold according to the shape of the user's head;

(c) inserting the forward portion of a supporting stand into the thus-formed female mold; and (d) filling the interior of the female mold with plaster to form a head-contoured male mold representing a faithful replica of the user's head shape.

11. A wig base formed by the method of claim 1, in which the meshes will be diamond-shaped.

* * * * *